UNITED STATES PATENT OFFICE.

EDWARD S. CHAPIN, OF NEW YORK, N. Y.

SULFUR COLOR AND PROCESS OF MAKING SAME.

No. 909,153.　　　Specification of Letters Patent.　　Patented Jan. 12, 1909.

Application filed February 23, 1906. Serial No. 302,470.

*To all whom it may concern:*

Be it known that I, EDWARD S. CHAPIN, a citizen of the United States, and a resident of the borough of Brooklyn, city and State of New York, have invented certain new and useful Improvements in Sulfur Colors and Processes of Making the Same, of which the following is a specification.

My invention consists substantially in heating a carbohydrate with an aromatic chemical and sulfuring agents, the latter being employed in certain proportions, until a dyestuff is produced.

I have this day signed an application (Serial No. 301,980) in which I disclose new sulfur colors made from non-crystallizable polysaccharids, aromatic chemicals, and sulfuring agents. I know of the invention by another, of new sulfur colors made from the sugars, aromatic chemicals and sulfuring agents. The non-crystallizable polysaccharids and the sugars form the group of chemicals known as the carbohydrates. (Tollens, "*Kohlenhydrate*," Breslau, 1895, Vol. II, pp. 55–276). In making these substances the sulfuring agent employed consists substantially of a mixture of sixty parts by weight of sodium sulfid crystals and fifteen parts of sulfur, a ratio of four to one. I have found that in practice sodium sulfid crystals will, in boiling water, absorb about one third of their weight of ordinary sulfur.

In my new process I increase the relative amount of sulfur, so as to introduce into the melt more sulfur than the sodium sulfid crystals will absorb. Thus with 240 parts by weight of sodium sulfid crystals I may use 156 parts or even more, of sulfur, a ratio of 3 to 2 or more. I obtain thereby new colors, with properties superior to those above referred to. The same ingredients, with the excess of sulfur, submitted to the same range of temperature yield colors of greatly increased tinctorial strength and either of greater brightness or of new tone impossible to obtain by the use of the smaller amount of sulfur. The excess sulfur reaction is also more facile and lends itself to a much broader and finer range and line of colors. Where with the smaller amount of sulfur a series of colors could be obtained plainly separable in shade from one another, the differences are multiplied greatly where the excess of sulfur is used: the shades are brightened, or become more individualized. An olive brown becomes a cleaner cut olive, a dark brown becomes a bloomy medium reddish brown of a greater specific commercial utility, while a medium cutch brown increases greatly in fine brightness. In all cases the strengths of the colors are considerably increased, being doubled or even trebled in tinctorial power.

That these stronger coloring matters are new products and not simply a concentrated form of the colors obtained by using less sulfur, is shown by the resultant variations of shade, both in the dyeing and in solutions in solvents. For example, with metaphenylene diamin and wheat starch the shade of the new color is much brighter, in fact brighter when using only 6 grams of metaphenylene diamin than can be obtained by using 12 grams of this expensive chemical with the less amount of sulfur. The difference between the results of the two methods is even more marked when used with wood sawdust and metaphenylene diamin, with the excess sulfur a medium yellow brown to olive brown being obtained, while with the smaller amount of sulfur a dull cutch brown of a much redder tone is obtained.

The following examples may illustrate the manner in which dyestuffs may be produced by my new method.

*Example 1. Wheat, corn or potato starch and metaphenylene diamin.*—Into a suitable crucible weigh 40 grams of sodium sulfid crystals and 26 grams of sulfur. Add 200 c. c. of water and boil five minutes. Then add 10 grams of wheat, corn or potato starch worked up into a thin paste in 50 c. c. of water. Then add 6 grams of metaphenylene diamin. Boil slowly until the water has evaporated. Then raise the temperature gradually in about half an hour to 300° C. Continue heating for another half hour, or until the full strength and shade of the color have been developed. Stir frequently so as to prevent burning of the mass. The coloring matter thus obtained is readily soluble in cold water, in cold alkaline or cold sodium sulfid solutions, to a bright cutch brown solution, fairly soluble in cold alcohol to a yellowish brown shade, and dyes cotton directly in a salt bath a fast bright cutch brown shade with the assistance of sodium sulfid or sal soda.

If desired, the unconcentrated melt can be dissolved in water and treated with an acid to secure the concentrated color principle. The dried precipitate obtained is insoluble in cold water or cold alcohol, soluble in a solution of sodium sulfid crystals to a bright cutch brown solution, and dyes cotton directly in a salt bath, with the assistance of sal soda and sodium sulfid, fast bright cutch brown shades. The color may be developed by treating the dyed skein in a bath of peroxid of hydrogen, a bronzy yellow being thus formed.

If in the above formula 3 grams of blue stone are added as an ingredient, the shades of the resultant coloring matter are practically uninfluenced thereby, but its fastness to agents is generally greatly improved.

*Example II. Gum arabic and metaphenylene diamin.*—For the starch in Example I substitute gum arabic and use more water at the start. The resultant product is similar in characteristics to that obtained in Example I.

*Example III. Wood sawdust and metaphenylene diamin.*—Into a suitable crucible weigh 40 grams of sodium sulfid crystals and 26 grams of sulfur. Boil up for five minutes. Then add 10 grams of wood sawdust and 6 grams of metaphenylene diamin. Boil one hour to impregnate the sawdust thoroughly with the sulfuring agents. Then raise the temperature slowly to 320° C., covering the crucible to prevent burning of the contents. Heat at 320° C. for one hour or until the full strength and shade of the color have been developed. The coloring matter obtained is readily soluble in cold water, cold alkaline and cold sodium sulfid solutions to a rich medium yellowish brown solution, fairly soluble in alcohol, and dyes cotton directly from a salt bath with the assistance of sal soda or sodium sulfid fast medium yellow brown shades.

The coloring principle can be obtained in a purer and more concentrated form by precipitating with acids in the well-known manner. The coloring matter thus obtained is insoluble in water and alcohol, soluble in a solution of sodium sulfid to a medium yellow brown, and dyes cotton directly in a salt bath with the assistance of sal soda and sodium sulfid fast medium yellow brown shades. If the amount of metaphenylene diamin be increased to 12 grams the coloring matter will be more olive in tone; but otherwise the properties and characteristics are similar.

*Example IV. Wheat starch and metadinitrobenzene.*—For the metaphenylene diamin in Example I substitute metadinitrobenzene, gram for gram. The coloring matter obtained is a medium brown of an intermediate shade with characteristics generally similar to those of the coloring matter obtained from metaphenylene diamin. If in this example there be substituted for the 6 grams of metadinitrobenzene the reduction products obtained by heating 5 grams metadinitrobenzene with 30 grams of sodium sulfid crystals, or by heating 16 grams metadinitrobenzene with 40 grams of sodium sulfid crystals, coloring matters are formed which are considerably brighter in tone.

*Example V. Wheat starch and dinitrochlorbenzol.*—For metaphenylene diamin in Example I substitute dinitrochlorbenzol, gram for gram. The resultant product is similar in characteristics to that obtained from metaphenylene diamin, though darker in shade. It dyes cotton a rich cutch brown of a yellowish tone.

*Example VI. Wheat starch and the sodium salt of sulfanilic acid.*—For metaphenylene diamin in Example I substitute the sodium salt of sulfanilic acid, gram for gram. The resultant coloring matter is similar in characteristics to that obtained by the use of metaphenylene diamin, but the shade is much darker. It is a rich full cutch brown of a reddish tone.

Coloring matters may be obtained from other carbohydrates and aromatic chemicals. Thus a medium brown can be obtained from gum arabic and amidoazobenzol hydrochlorate; and browns from the condensation products of dinitrochlorbenzol with anilin, or with xylidin, and the starches, a medium yellow brown and a cutch brown being obtained respectively. The sugars will yield coloring matters similar to those obtained from the starches by methods similar to that of Example I.

It will be noted that some of the above-mentioned aromatic chemicals, such as metaphenylene diamin, are color-formers, that is to say, will give coloring matters when sulfured, while others, such as amidoazobenzol hydrochlorate, are non-color-formers.

When speaking in the claims of "sulfuring substances containing an excess of sulfur" I mean that the amount of sulfur used is more than the sodium sulfid or the caustic soda can absorb. The usual sulfuring substances are either sodium sulfid and sulfur, or caustic soda and sulfur.

I claim:

1. The process for the production of coloring matters consisting in heating a corbohydrate together with an aromatic chemical with sulfuring substances containing an excess of sulfur.

2. The process for the production of coloring matters consisting in heating a carbohydrate together with a color-forming aromatic chemical with sulfuring substances containing an excess of sulfur.

3. The process for the production of coloring matters consisting in heating a carbohydrate together with metaphenylene diamin with sulfuring substances containing an excess of sulfur.

4. The process for the production of coloring matters consisting in heating a non-crystallizable polysaccharid together with an aromatic chemical with sulfuring substances containing an excess of sulfur.

5. The process for the production of coloring matters consisting in heating a non-crystallizable polysaccharid together with a color-forming aromatic chemical with sulfuring substances containing an excess of sulfur.

6. The process for the production of coloring matters consisting in heating a non-crystallizable polysaccharid together with metaphenylene diamin with sulfuring substances containing an excess of sulfur.

7. The process for the production of coloring matters consisting in heating wheat starch together with an aromatic chemical with sulfuring substances containing an excess of sulfur.

8. The process for the production of coloring matters consisting in heating wheat starch together with a color-forming aromatic chemical with sulfuring substances containing an excess of sulfur.

9. The process for the production of coloring matters consisting in heating wheat starch together with metaphenylene diamin with sulfuring substances containing an excess of sulfur.

10. The process for the production of coloring matters consisting in heating wheat starch together with metaphenylene diamin with sodium sulfid and sulfur in excess of the quantity which the sodium sulfid can absorb.

11. As a new article of manufacture, the coloring matter which can be produced by heating wheat starch together with metaphenylene diamin with sodium sulfid and sulfur in excess of the quantity which the sodium sulfid can absorb, which is readily soluble in cold water, in cold alkaline or cold sodium sulfid solutions to a bright cutch brown solution, fairly soluble in cold alcohol to a yellowish brown shade, and which dyes cotton directly in a salt bath a fast bright cutch brown shade with the assistance of sodium sulfid or sal soda, and which when precipitated by acids forms a coloring matter which is insoluble in cold water or cold alcohol, soluble in a solution of sodium sulfid crystals to a bright cutch brown solution, and dyes cotton directly in a salt bath, with the assistance of sal soda and sodium sulfid, fast brown shades.

In testimony whereof, I have hereunto signed my name in the presence of two subscribing witnesses.

EDWARD S. CHAPIN.

Witnesses:
 FRITZ V. BRIESEN,
 JOHN A. KEHLENBECK.